(12) United States Patent
Izumi

(10) Patent No.: US 9,446,671 B2
(45) Date of Patent: Sep. 20, 2016

(54) ELECTRICAL STORAGE SYSTEM

(71) Applicant: TOYOTA JIDOSHA KABUSHIKI KAISHA, Toyota-shi, Aichi-ken (JP)

(72) Inventor: Junta Izumi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 14/531,235

(22) Filed: Nov. 3, 2014

(65) Prior Publication Data
US 2015/0130414 A1    May 14, 2015

(30) Foreign Application Priority Data
Nov. 8, 2013   (JP) ................................ 2013-232567

(51) Int. Cl.
H02J 7/00    (2006.01)
B60L 11/18   (2006.01)
H02J 7/02    (2016.01)

(52) U.S. Cl.
CPC .......... *B60L 11/1812* (2013.01); *H02J 7/0029* (2013.01); *H02J 7/0055* (2013.01); *H02J 7/02* (2013.01)

(58) Field of Classification Search
CPC .............................. B60L 11/1812; H02J 7/007
USPC ........................................................ 320/109
See application file for complete search history.

(56) References Cited

U.S. PATENT DOCUMENTS

| 2014/0009117 A1* | 1/2014 | Ishii ........................ H02J 7/34 320/126 |
| 2014/0021923 A1* | 1/2014 | Uchida .................. H02J 7/0016 320/118 |
| 2014/0091764 A1 | 4/2014 | Kinomura et al. |
| 2014/0111122 A1* | 4/2014 | Kawashima .......... H02J 7/0029 318/139 |
| 2014/0111160 A1* | 4/2014 | Nozawa ............... G01R 31/362 320/118 |

FOREIGN PATENT DOCUMENTS

| JP | A-2011-120395 | 6/2011 |
| JP | 2011205755 A | 10/2011 |
| JP | A-2012-228060 | 11/2012 |
| JP | A-2012-249384 | 12/2012 |
| JP | 2013188068 A | 9/2013 |
| WO | WO 2012/164644 A1 | 12/2012 |

* cited by examiner

*Primary Examiner* — Sun Lin
(74) *Attorney, Agent, or Firm* — Oliff PLC

(57) ABSTRACT

An electrical storage system includes an electrical storage device, a motor, a system main relay, a first charging line, a charger, a first charging relay, a second charging line, an inlet, a second charging relay and a controller. The controller is configured to control a energizing state and a non-energizing state of the system main relay, the first charging relay and the second charging relay. The controller is configured to cause the first charging relay to the non-energizing state when the second charging relay in the energizing state is subjected to adhesion.

5 Claims, 7 Drawing Sheets

ELECTRICAL STORAGE SYSTEM

INCORPORATION BY REFERENCE

The disclosure of Japanese Patent Application No. 2013-232567 filed on Nov. 8, 2013 including the specification, drawings and abstract is incorporated herein by reference in its entirety.

BACKGROUND OF THE INVENTION

1. Field of the Invention

The invention relates to an electrical storage system capable of charging an electrical storage device using a direct-current (DC) power supply and an alternating-current (AC) power supply.

2. Description of Related Art

In Japanese Patent Application Publication No. 2012-228060 (JP 2012-228060 A), a system for charging a battery for traveling using a DC power supply is disclosed. In the system, a main contactor (so-called relay) is provided on a main power line connecting the battery for traveling with an inverter. By allowing the main contactor to be turned on, electric power can be supplied to the inverter from the battery for traveling, to enable a vehicle to travel.

In the system disclosed in JP 2012-228060 A, a charging line is connected to the main power line between the main contactor and the inverter, and a charging contactor (so-called relay) is provided on the charging line. A vehicle-side connector connected to the charging line is connectable with a charger-side connector which is connected to a charger including a DC power supply. If the charger-side connector is connected with the vehicle-side connector and the charging contactor is turned on, electric power from the DC power supply can be supplied to the battery for travelling to charge the battery for travelling.

In the system disclosed in JP 2012-228060 A, to supply the electric power from the DC power supply to the battery for travelling, the main contactor has to be turned on as well as the charging contactor. Furthermore, the main contactor is also in the on state during the travelling of the vehicle.

The charging contactor includes a movable contact and a fixed contact. Therefore, the movable contact may adhere to the fixed contact. If the charging contactor keeps being turned on due to the adhesion of the charging contactor, voltage of the battery for travelling will be applied to the vehicle-side connector via the charging line, when the main contactor is turned on for the travelling of the vehicle.

To avoid this situation, it suffices not to turn on the main contactor when the charging contactor is subjected to adhesion. However, if the main contactor cannot be turned on, the battery for travelling cannot be connected to the inverter, and thus the vehicle cannot travel.

SUMMARY OF THE INVENTION

An aspect of the invention provides an electrical storage system. The electrical storage system includes an electrical storage device, a motor, a system main relay, a first charging line, a charger, a first charging relay, a second charging line, an inlet, a second charging relay and a controller. The electrical storage device is configured to charge and discharge. The motor is connected to the electrical storage device via an electrode line. The motor is configured to receive electric power output from the electrical storage device to generate power allowing a vehicle to travel. The system main relay is provided on the electrode line. The first charging line is connected to the electrode line. The first charging line is configured to supply electric power from an AC power supply provided outside the vehicle to the electrical storage device. The charger is provided on the first charging line. The charger is configured to convert AC power from the AC power supply into DC power and output the DC power to the electrical storage device. The first charging relay is provided on the first charging line between the electrical storage device and the charger. The second charging line is connected to the first charging line between the charger and the first charging relay. The second charging line is configured to supply electric power from the DC power supply provided outside the vehicle to the electrical storage device. The inlet is provided at an end of the second charging line and connectable with a connector connected to the DC power supply. The second charging relay is provided on the second charging line. The controller is configured to control an energizing state and a non-energizing state of the system main relay, the first charging relay and the second charging relay. The controller is configured to cause the first charging relay to become the non-energizing state when the second charging relay in the energizing state is subjected to adhesion.

In the aspect of the present invention, the inlet is connected to the electrical storage device via the second charging line, the first charging line and the electrode line. That is, the inlet is connected to the electrical storage device in the order of the second charging line, the first charging line and the electrode line. Herein, when the first charging relay provided on the first charging line is in the non-energizing state, a current path between the electrical storage device and the inlet is cut off. Therefore, when the second charging relay in the energizing state is subjected to adhesion, voltage of the electrical storage device can be prevented from being applied to the inlet if the first charging relay is brought into the non-energizing state.

The first charging line is connected to the electrode line connecting the electrical storage device and the motor. Therefore, even if the first charging relay provided on the first charging line goes into the non-energizing state, electric power of the electrical storage device can be supplied to the motor by causing the system main relay provided on the electrode line to become the energizing state. Therefore, the first charging relay is brought into the non-energizing state to prevent the voltage of the electrical storage device from being applied to the inlet, and meanwhile the electric power of the electrical storage device can be supplied to the motor to allow the vehicle to travel.

In the above aspect, the first charging line may be connected to the electrode line between the electrical storage device and the system main relay. Thus, electric power from the AC power supply can be supplied to the electrical storage device without going through the system main relay. The system main relay includes a movable contact and a fixed contact. Therefore, a contacting portion between the movable contact and the fixed contact tends to cause a loss of electric power. If the electric power of the AC power supply is supplied to the electrical storage device without going through the system main relay, more electric power can be supplied to the electrical storage device.

In the above aspect, the controller may determine that the second charging relay in the energizing state is subjected to adhesion, when a driving signal causing the second charging relay to the non-energizing state has been output and the second charging line is in the energizing state. Whether the second charging relay in the energizing state is subjected to adhesion can be determined, by outputting to the second charging relay a driving signal causing it to become the non-energizing state. When the second charging relay in the energizing state is not subjected to adhesion, the second charging relay receives the driving signal for the non-energizing state and goes into the non-energizing state. Meanwhile, no current flows on the second charging line. On the other hand, when the second charging relay in the energizing state is subjected to adhesion, the second charging relay still keeps the energizing state even if receiving the driving signal for the non-energizing state. Meanwhile, current flows on the second charging line. Therefore, by determining whether the second charging line is in the energizing state, whether the second charging relay in the energizing state is subjected to adhesion can be determined.

In the above aspect, the vehicle may use power from at least one of the motor or an engine to travel. When the first charging relay is in the non-energizing state, electric power cannot be supplied to the electrical storage device from the AC power supply and the DC power supply. Thus, charging amount of the electrical storage device decreases continuously, and sometimes electric power cannot be supplied to the motor from the electrical storage device. Even in this case, power of the engine can be used for the travelling of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the present invention is described below.

Figure 1:
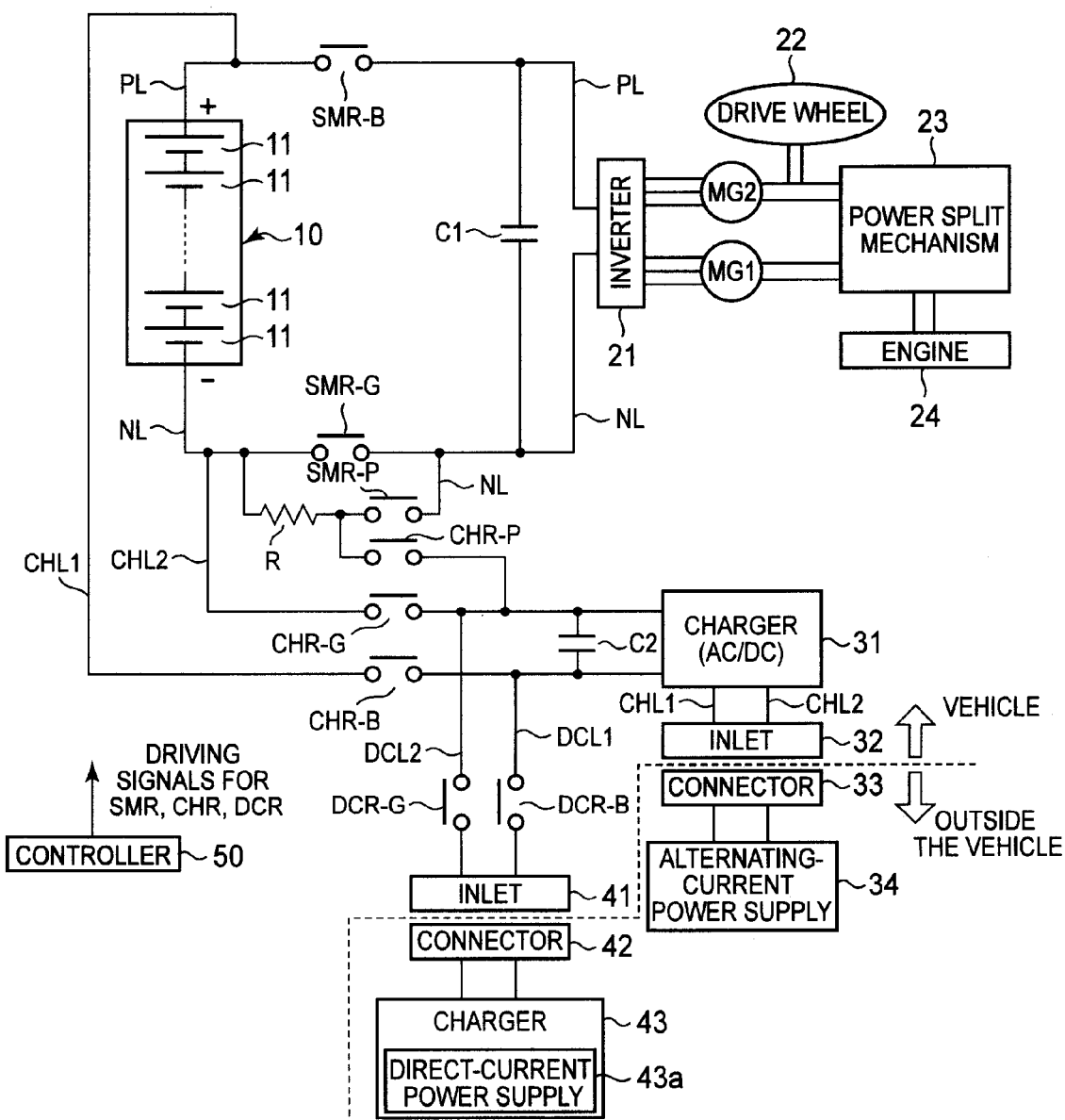
FIG. 1 is a diagram showing a configuration of a battery system as the first embodiment.

FIG. 1 is a diagram showing a configuration of a battery system (corresponding to an electrical storage system of the present invention) of the present embodiment. The battery system shown in FIG. 1 is carried on a vehicle.

A battery pack (corresponding to an electrical storage device of the present invention) 10 has a plurality of single cells 11 connected in series. A secondary battery such as a nickel-hydride battery and/or a lithium ion battery may be used as the single cell 11. Additionally, an electric double layer capacitor may also be used instead of the secondary battery. In the battery pack 10 of the present embodiment, all single cells 11 are connected in series, however, the battery pack 10 may also include a plurality of single cells 11 connected in parallel.

A positive electrode line (corresponding to an electrode line of the present invention) PL is connected to a positive electrode terminal of the battery pack 10, and a negative electrode line (corresponding to the electrode line of the present invention) NL is connected to a negative electrode terminal of the battery pack 10. The battery pack 10 is connected to an inverter 21 via the positive electrode line PL and the negative electrode line NL. A system main relay SMR-B is provided on the positive electrode line PL, and a system main relay SMR-G is provided on the negative electrode line NL. The system main relays (corresponding to a system main relay of the present invention) SMR-B, SMR-G receive a driving signal from a controller 50 to switch between ON (a energizing state) and OFF (a non-energizing state).

The system main relay SMR-G is connected in parallel with a resistor element R and a system main relay SMR-P. The resistor element R is connected in series with the system main relay SMR-P. Herein, a line connected with the resistor element R and the system main relay SMR-P is a portion of the negative electrode line NL. The system main relay SMR-P receives a driving signal from the controller 50 to switch between ON (an energizing state) and OFF (a non-energizing state).

A smoothing capacitor C1 is connected with the positive electrode line PL between the system main relay SMR-B and the inverter 21 and the negative electrode line NL between the system main relays SMR-G, SMR-P and the Inverter 21.

The controller 50 switches the system main relays SMR-B, SMR-P from OFF to ON, when the battery pack 10 is connected to the inverter 21. Thus, discharging current of the battery pack 10 flows into the smoothing capacitor C1, and the smoothing capacitor C1 is charged. Because charging current of the smoothing capacitor C1 flows through the resistor element R, surge current can be restrained from flowing into the smoothing capacitor C1.

Then the controller 50 switches the system main relay SMR-G from OFF to ON, and switches the system main relay SMR-P from ON to OFF. Thus, the connection of the battery pack 10 with the inverter 21 is completed, and the battery system shown in FIG. 1 goes into a ready-on state. When an ignition switch is switched from OFF to ON, the battery system goes into the ready-on state, as described above. When the battery system is in the ready-on state, the vehicle is enabled to travel, as described below.

The inverter 21 converts DC power output from the battery pack 10 into AC power, and outputs the AC power to a motor generator (corresponding to a motor of the present invention) MG2. The motor generator MG2 receives the AC power output from the inverter 21 to generate kinetic energy. The vehicle is enabled to travel by transferring the kinetic energy (motive power) generated by the motor generator MG2 to a drive wheel 22.

Power of an engine 24 is transferred by a power split mechanism 23 to the drive wheel 22 or to a motor generator MG1. The motor generator MG1 receives the power of the engine 24 to generate electric power. AC power generated by the motor generator MG1 is supplied to the motor generator MG2 or the battery pack 10 via the inverter 21. If the electric power generated by the motor generator MG1 is supplied to the motor generator MG2, the drive wheel 22 can be driven by the kinetic energy generated by the motor generator MG2. If the electric power generated by the motor generator MG1 is supplied to the battery pack 10, the battery pack can be charged.

A step-up circuit may be provided on a current path between the battery pack 10 and the inverter 21. The step-up circuit can step up output voltage of the battery pack 10, and outputs stopped-up electric power to the inverter 21. The step-up circuit can step down output voltage of the inverter 21, and outputs the stepped-down electric power to the battery pack 10.

A charging line (corresponding to a first charging line of the present invention) CHL1 is connected to the positive electrode line PL between the positive electrode terminal of the battery pack 10 and the system main relay SMR-B. A charging line (corresponding to the first charging line of the present invention) CHL2 is connected to the negative electrode line NL between the negative electrode terminal of the battery pack 10 and the system main relay SMR-G. Furthermore, the charging line CHL2 is connected to the negative electrode line NL between the negative electrode terminal of the battery pack 10 and the resistor element R.

The charging lines CHL1, CHL2 are connected to a charger (corresponding to a charger of the present invention) 31. A charging relay CHR-B is provided on the charging line CHL1, and a charging relay CHR-G is provided on the charging line CHL2. Specifically, the charging relay CHR-B is provided on the charging line CHL1 between the positive electrode terminal of the battery pack 10 and the charger 31. Furthermore, the charging relay CHR-G is provided on the charging line CHL2 between the negative electrode terminal of the battery pack 10 and the charger 31.

The charging relays (corresponding to a first charging relay of the present invention) CHR-B, CHR-G receive a driving signal from the controller 50 to switch between ON (an energizing state) and OFF (a non-energizing state). A smoothing capacitor C2 is connected with the charging line CHL1 between the charging relay CHR-B and the charger 31 and the charging line CHL2 between the charging relay CHR-G and the charger 31.

One end of the charging relay CHR-P is connected to a connecting point between the resistor element R and the system main relay SMR-P. The other end of the charging relay CHR-P is connected the charging line CHL2 between the charging relay CHR-G and the charger 31. The charging relay CHR-P receives a driving signal from the controller 50 to switch between ON (an energizing state) and OFF (a non-energizing state).

An inlet 32 is connected to the charger 31 via the charging lines CHL1, CHL2. The inlet 32 is connectable with a connector 33. That is, the connector 33 can be connected to the inlet 32, and the connector 33 can be removed from the inlet 32. The connector 33 is connected to an AC power supply 34 via a cable. The connector 33 and the AC power supply 34 are provided outside the vehicle independently of the vehicle. A commercial power supply, for example, is used as the AC power supply 34.

Electric power from the AC power supply 34 can be supplied to the battery pack 10 to charging the battery pack 10, by connecting the connector 33 with the inlet 32. Herein, the charger 31 converts the AC power supplied from the AC power supply 34 into DC power, and outputs the DC power to the battery pack 10. Furthermore, the charger 31 can step up output voltage of the AC power supply 34, and outputs the stepped-up electric power to the battery pack 10. A commonly known configuration may be appropriately employed as the charger 31. The charger 31 has two transformers which are insulated from each other.

One end of a charging line (corresponding to a second charging line of the present invention) DCL1 is connected to the charging line CHL1 between the charging relay CHR-B and the charger 31. The other end of the charging line DCL1 is connected to an inlet 41. A charging relay DCR-B is provided on the charging line DCL1. One end of a charging line (corresponding to the second charging line of the present invention) DCL2 is connected to the charging line CHL2 between the charging relay CHR-G and the charger 31. The other end of the charging line DCL2 is connected to the inlet (corresponding to the INLET of the present invention) 41. A charging relay DCR-G is provided on the charging line DCL2. The charging relays (corresponding to a second charging relay of the present invention) DCR-B, DCR-G receive a driving signal from the controller 50 to switch between ON (an energizing state) and OFF (a non-energizing state).

The inlet 41 is connectable with a connector (corresponding to a connector of the present inventions) 42. That is, the connector 42 can be connected to the inlet 41, and the connector 42 can be removed from the inlet 41. The connector 42 is connected to a charger 43 via a cable. The connector 42 and the charger 43 are provided outside the vehicle independently of the vehicle. The charger 43 has a DC power supply 43a, and can communicate with the controller 50. Electric power from the DC power supply 43a can be supplied to the battery pack 10 to charge the battery pack 10, by connecting the connector 42 with the inlet 41.

A current value when the battery pack 10 is charged by the DC power supply 43a is larger than a current value when the battery pack 10 is charged by the AC power supply 34. Thus, when the battery pack 10 is charged with a predetermined charging amount, charging time using the DC power supply 43a is shorter than charging time using the AC power supply 34.

In the present embodiment, the resistor element R is connected with the system main relay SMR-P and the charging relay CHR-P, which is not limited to this. Specifically, as shown in FIG. 2, a resistor element R1 may also be connected with the system main relay SMR-P, and a resistor element R2 may be connected with the charging relay CHR-P.

The system main relay SMR-P and the resistor element R1 are connected in parallel with the system main relay SMR-G. The charging relay CHR-P and the resistor element R2 are connected in parallel with the charging relay CHR-G. In the configuration shown in FIG. 1, it suffices only to use one resistor element R instead of the two resistor elements R1, R2 shown in FIG. 2. Therefore, the number of the resistor element R can be reduced.

Figure 2:
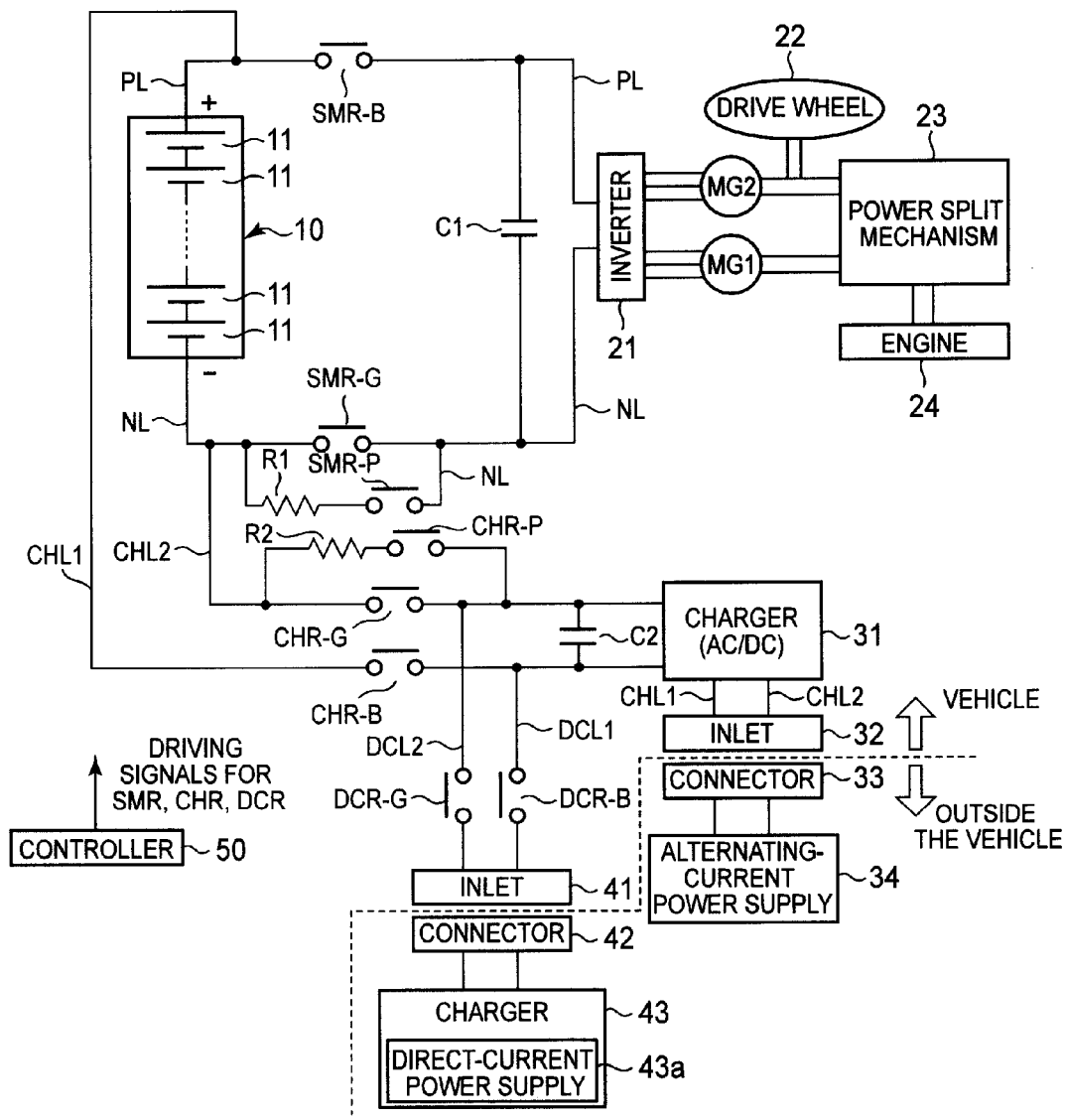
FIG. 2 is a diagram showing another configuration of the battery system in the first embodiment.

In the configuration shown in FIG. 2, the system main relay SMR-P and the resistor element R1 may be omitted. In this case, it suffices to charge the smoothing capacitor C1 before the system main relays SMR-B, SMR-G are turned on. Thus, surge current can be prevented from flowing into the smoothing capacitor C1 when the system main relays SMR-B, SMR-G are turned on. For example, the smoothing capacitor C1 may be charged using discharging current of a battery of an auxiliary machine carried on the vehicle. Furthermore, the charging relay CHR-P and the resistor element R2 may also be omitted similar to the case that the system main relay SMR-P and the resistor element R1 are omitted.

The vehicle of the present embodiment has the battery pack 10 and the engine 24 as power sources for allowing the vehicle to travel, which is not limited to this. Specifically, the present invention can also be applied in a vehicle (so-called electric vehicle) only having the battery pack 10 as a power source.

Figure 3:
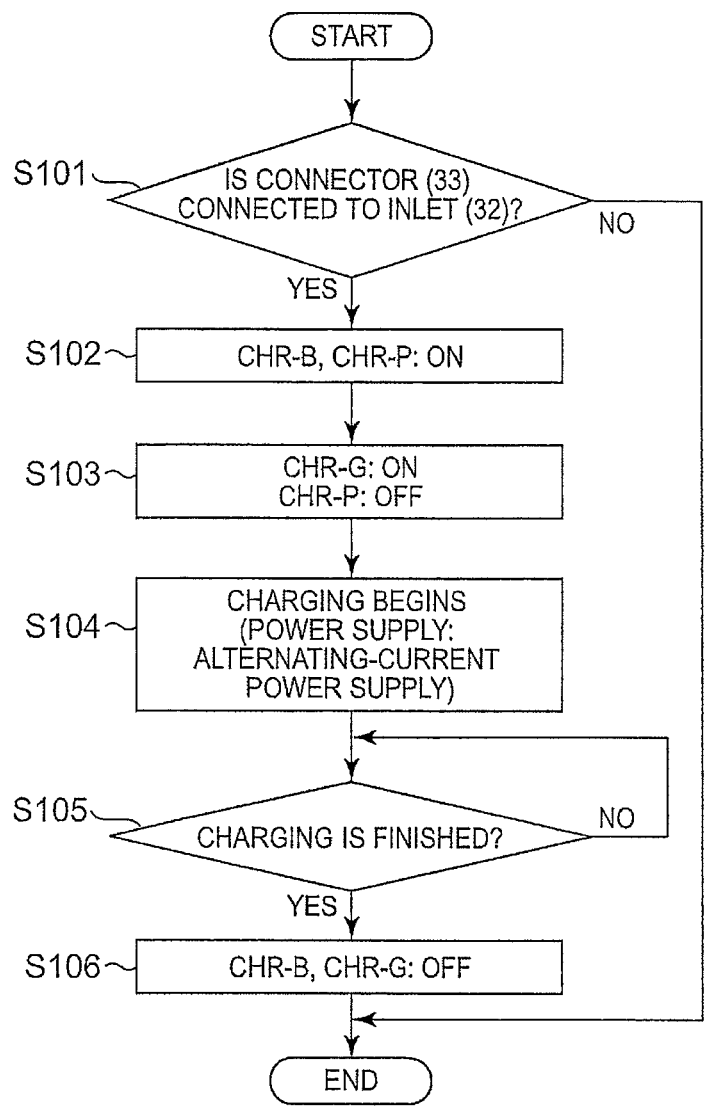
FIG. 3 is a flowchart illustrating charging process of a battery pack using an AC power supply.

Then, process of charging the battery pack 10 using the AC power supply 34 is illustrated using a flowchart shown in FIG. 3. The process shown in FIG. 3 is performed by the controller 50. The charging relays CHR-B, CHR-G, CHR-P are in the off state when the process shown in FIG. 3 is started.

In step S101, the controller 50 determines whether the connector 33 is connected to the inlet 32. A commonly known method may be appropriately employed as the determining method. When the connector 33 is not connected to the inlet 32, the process shown in FIG. 3 ends.

When the connector 33 is connected to the Inlet 32, in step S102, the controller 50 switches the charging relays CHR-B, CHR-P from OFF to ON. Thus, discharging current of the battery pack 10 flows into the smoothing capacitor C2, and the smoothing capacitor C2 can be charged. Because charging current of the smoothing capacitor C2 flows through the resistor element R, surge current can be prevented from flowing into the smoothing capacitor C2.

In step S103, the controller 50 switches the charging relay CHR-G from OFF to ON, and switches the charging relay CHR-P from ON to OFF. In step S104, the controller 50 begins charging of the battery pack 10. Herein, the controller 50 outputs electric power from the AC power supply 34 to the battery pack 10 by controlling operations of the charger 31.

In step S105, the controller determines whether the charging of the battery pack 10 should be finished. For example, it is determined that the charging of the battery pack 10 should be finished when an SOC (State of Charge) of the battery pack 10 has reached a preset SOC (a target value). The SOC refers to a proportion of a current charging capacity with respect to full charging capacity. The SOC of the battery pack 10 can be estimated according to a voltage value and/or a current value of the battery pack 10 as commonly known.

On the other hand, it is determined that the charging of the battery pack 10 should be finished when charging amount of the battery pack 10 has reached a preset charging amount (a target value). The charging amount of the battery pack 10 refers to charging amount since the battery pack 10 begins to be charged using the AC power supply 34. The charging amount of the battery pack 10 can be calculated in case of using a current sensor for detecting a current value when the battery pack 10 is charged.

when it is determined that the charging of the battery pack 10 should be finished, in step S106, the controller 50 switches the charging relays CHR-B, CHR-G from ON to OFF. Furthermore, the controller 50 makes the charger 31 stop operation. Thus, the charging of the battery pack 10 using the AC power supply 34 is finished.

As illustrated in FIG. 3, when the battery pack 10 is charged using the AC power supply 34, it suffices only to control ON/OFF of the charging relays CHR-B, CHR-G, CHR-P. That is, charging current from the AC power supply 34 does not flow through the system main relays SMR-B, SMR-G, SMR-P.

When the charging current from the AC power supply 34 flows through the system main relays SMR-B, SMR-G, SMR-P, a loss of electric power on the system main relays SMR-B, SMR-G, SMR-P may be caused. The system main relays SMR-B, SMR-G, SMR-P include a movable contact and a fixed contact, and at a contacting portion between the movable contact and the fixed contact, the loss of electric power tends to be larger. In the present embodiment, such loss of electric power can be prevented. Therefore, more charging current can flow into the battery pack 10 from the AC power supply 34.

On the other hand, when the vehicle travels, ON/OFF of the charging relays CHR-B, CHR-G, CHR-P need not to be controlled, as described above, it suffices only to control ON/OFF of the system main relays SMR-B, SMR-G. SMR-P.

In the configuration shown in FIG. 2, when the charging relay CHR-P and the resistor element R2 are omitted, and the electric power from the AC power supply 34 can be supplied to the battery pack 10 by turning on the charging relays CHR-B, CHR-G. Herein, it suffices to charge the smoothing capacitor C2 before the charging relays CHR-B, CHR-G are turned on. For example, when the charging relays CHR-B, CHR-G are in the off state, the smoothing capacitor C2 is charged by adjusting electric power from the charger 31.

Figure 4:
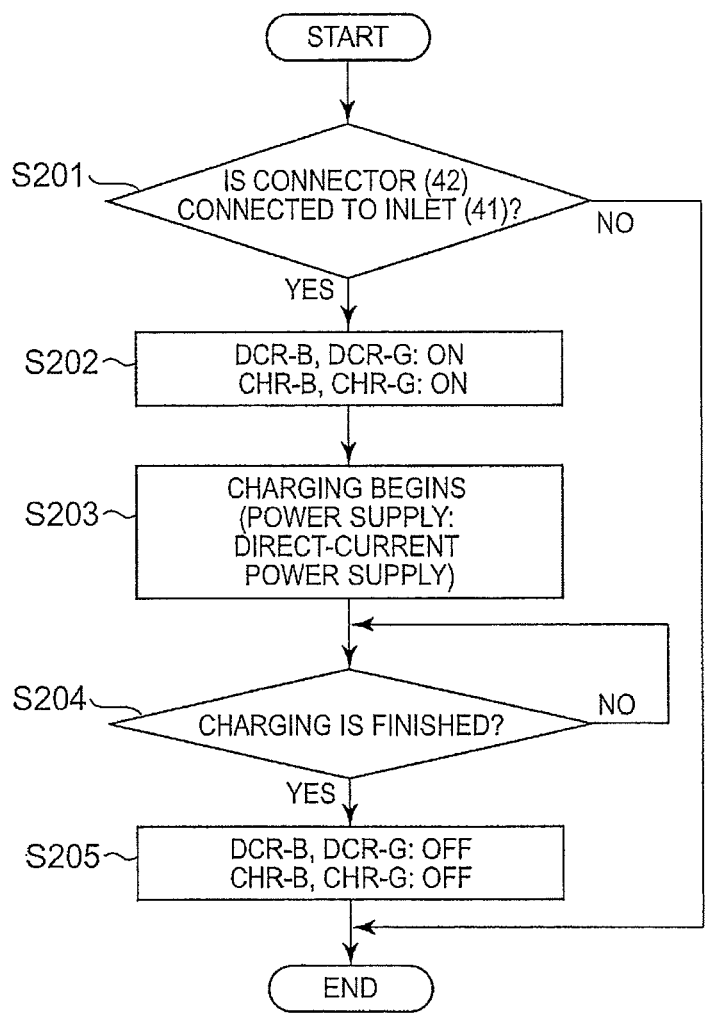
FIG. 4 is a flowchart illustrating charging process of a battery pack using a DC power supply.

Subsequently, process of charging the battery pack 10 using the DC power supply 43*a* is illustrated using a flowchart shown in FIG. 4. The process shown in FIG. 4 is performed by the controller 50. When the process shown in FIG. 4 is started, the charging relays CHR-B, CHR-G, CHR-P and the charging relays DCR-B, DCR-G are in the off state.

In step S201, the controller 50 determines whether the connector 42 is connected to the inlet 41. A commonly known method may be appropriately employed as the determining method. When the connector 42 is not connected to the inlet 41, the process shown in FIG. 4 ends.

When the connector 42 is connected to the inlet 41, in step S202, the controller 50 switches the charging relays DCR-B, DCR-G from OFF to ON, and switches the charging relays CHR-B, CHR-G from OFF to ON. In step S203, the controller 50 begins to charge the battery pack 10 using the DC power supply 43*a*. Specifically, the controller 50 may supply electric power from the DC power supply 43*a* to the battery pack 10 by sending a command of starting charging to the charger 43.

In step S204, the controller 50 determines whether the charging of the battery pack 10 should be finished. Due to the similarity of the process in step S204 to the process in the step S105 shown in FIG. 3, a detailed description is omitted. When it is determined that the charging of the battery pack 10 should be finished, in step S205, the controller 50 switches the charging relays DCR-B, DCR-G from ON to OFF, and switches the charging relays CHR-B, CHR-G from ON to OFF. Herein, the controller 50 may stop electric power supply from the DC power supply 43*a* to the battery pack 10 by sending a command of finishing charging to the charger 43. Thus, the charging of the battery pack 10 using the DC power supply 43*a* is finished.

When the battery pack 10 is charged using the DC power supply 43*a*, it suffices only to control ON/OFF of the charging relays DCR-B, DCR-G and the charging relays CHR-B, CHR-G. That is, charging current from the DC power supply 43*a* does not flow through the system main relays SMR-B, SMR-G, SMR-P. Thus, similar to the charging of the battery pack 10 using the AC power supply 34, a loss of electric power on the system main relays SMR-B, SMR-G, SMR-P can be prevented.

On the other hand, when the vehicle travels, it is no need to control the ON/OFF of the charging relays DCR-B, DCR-G as described above, it suffices only to control ON/OFF of the system main relays SMR-B, SMR-G, SMR-P.

Figure 5:
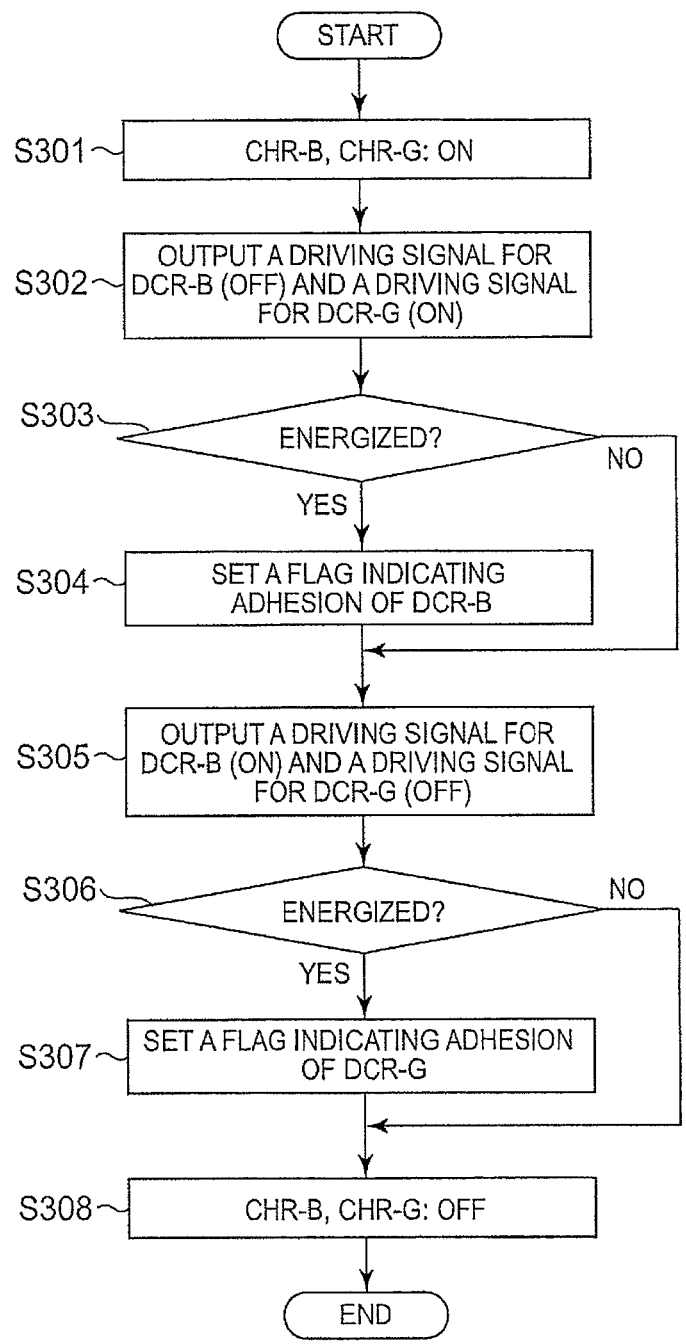
FIG. 5 is a flowchart illustrating process of determining adhesion of a charging relay.

Subsequently, process of determining adhesion of the charging relays DCR-B, DCR-G is illustrated using a flowchart shown in FIG. 5. For example, the process shown in FIG. 5 may be performed before or after the process shown in FIG. 4 is started. The process shown in FIG. 5 is performed by the controller 50. When the process shown in FIG. 5 begins, the connector 42 is connected to the inlet 41.

In step S301, the controller 50 switches the charging relays CHR-B, CHR-G from OFF to ON. In step S302, the controller 50 outputs a driving signal for turning off the charging relay DCR-B, and a driving signal for turning on the charging relay DCR-G.

In step S303, the controller 50 determines whether charging current flows from the DC power supply 43*a* to the battery pack 10. When the charging relay DCR-B is normal without adhesion, the charging relay DCR-B receives a driving signal from the controller 50 and is turned off. Thus, no charging current flows from the DC power supply 43*a* to the battery pack 10. That is, no current flows on the charging lines DCL1, DCL2.

On the other hand, when the charging relay DCR-B is subjected to adhesion, the charging relay DCR-B is in the on state irrespective of the driving signal from the controller 50. Herein, through the process of the steps S301, S302, the charging relays CHR-B, CHR-G and the charging relay DCR-G are in the on state. Therefore, charging current flows from the DC power supply 43*a* to the battery pack 10. That is, current flows on the charging lines DCL1, DCL2. Thus, whether the charging relay DCR-B is subjected to adhesion can be determined by determining whether current flows on the charging lines DCL1, DCL2.

The specific method of determining whether current flows on the charging lines DCL1, DCL2 will be described later. When current flows on the charging lines DCL1, DCL2, the controller 50 determines that the charging relay DCR-B is subjected to adhesion, and performs process of step S304. On the other hand, when no current flows on the charging lines DCL1, DCL2, the controller 50 determines that the charging relay DCR-B is not subjected to adhesion, and performs process of step S305.

In the step S304, the controller 50 sets a flag indicating that the charging relay DCR-B is subjected to adhesion. The set information of the flag may be stored in a memory. After the process of the step S304 is performed, the controller 50 performs the process of the step S305.

In the step S305, the controller 50 outputs a driving signal for turning on the charging relay DCR-B, and outputs a driving signal for turning off the charging relay DCR-G. In step S306, the controller 50 determines whether charging current flows from the DC power supply 43*a* to the battery pack 10.

When the charging relay DCR-G is normal without adhesion, the charging relay DCR-G receives a driving signal from the controller 50 and is turned off. Thus, no charging current flows from the DC power supply 43*a* to the battery pack 10. That is, no current flows on the charging lines DCL1, DCL2.

On the other hand, if the charging relay DCR-G is subjected to adhesion, the charging relay DCR-G is in the on state irrespective of the driving signal from the controller 50. Herein, the charging relays CHR-B, CHR-G and the charging relay DCR-B are in the on state through the process of the steps S301, S305. Therefore, charging current flows from the DC power supply 43*a* to the battery pack 10. That is, current flows on the charging lines DCL1, DCL2. Thus, whether the charging relay DCR-G is subjected to adhesion can be determined by determining whether current flows on the charging lines DCL1, DCL2.

When current flows on the charging lines DCL1, DCL2, the controller 50 determines that the charging relay DCR-G is subjected to adhesion, and performs process of step S307. On the other hand, when no current flows on the charging lines DCL1, DCL2, the controller 50 determines that the charging relay DCR-G is not subjected to adhesion, and performs process of step S308.

In the step S307, the controller 50 sets a flag indicating that the charging relay DCR-G is subjected to adhesion. The set information of the flag may be stored in a memory. After the process of the step S307 is performed, the controller 50 performs the process of the step S308. In the step S308, the controller 50 switches the charging relays CHR-B, CHR-G from ON to OFF. In the embodiment, the adhesion of the charging relay DCR-G is determined after the adhesion of the charging relay DCR-B is determined, but the determination of the adhesion may also be performed in reverse order.

Subsequently, a configuration for determining whether current flows on the charging lines DCL1, DCL2 is illustrated using FIG. 6.

Figure 6:
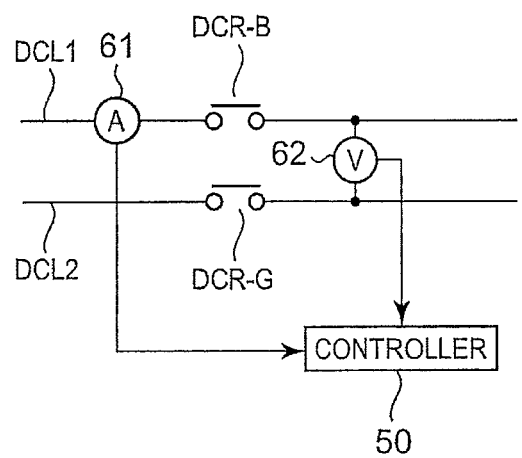
FIG. 6 is a diagram showing a configuration for determining adhesion of a charging relay.

In FIG. 6, a current sensor 61 is provided on the charging line DCL1. The current sensor 61 detects a current value flowing on the charging line DCL1, and outputs a detection result to the controller 50. When a current value detected by the current sensor 61 is larger than a current threshold, the controller 50 can determine that current flows on the charging lines DCL1, DCL2. Herein, the current threshold refers to a current value (substantially is 0 [A]) when no current flows on the charging lines DCL1, DCL2, which is set by considering a detection error of the current sensor 61 and the like.

When a current value detected by the current sensor 61 is equal to or less than the current threshold, the controller 50 can determine that no current flows on the charging lines DCL1, DCL2. In the example shown in FIG. 6, the current sensor 61 is provided on the charging line DCL1, but the current sensor 61 may be provided on at least one of the charging DCL1, DCL2. Even in this case, based on a detection result of the current sensor 61, it can also be determined whether current flows on the charging lines DCL1, DCL2.

On the other hand, as shown in FIG. 6, a voltage sensor 62 may be connected with the charging lines DCL1, DCL2. The voltage sensor 62 detects a voltage value between the charging lines DCL1, DCL2, and outputs the detection result to the controller 50.

When a voltage value detected by the voltage sensor 62 is larger than a voltage threshold, the controller 50 can determine that current flows on the charging lines DCL1, DCL2. Herein, the voltage threshold refers to a voltage value (substantially is 0 [V]) when no current flows on the charging lines DCL1, DCL2, which is set by considering a detection error of the voltage sensor 62 and the like. When a voltage value detected by the voltage sensor 62 is equal to or less than the voltage threshold, the controller 50 can determine that no current flows on the charging lines DCL1, DCL2.

At least one of the current sensor 61 or the voltage sensor 62 shown in FIG. 6 may be used when determining whether current flows on the charging lines DCL1, DCL2. Furthermore, in the configuration shown in FIG. 6, the current sensor 61 and/or the voltage sensor 62 is connected to the charging lines DCL1, DCL2, but it is not limited to this. That is, the current sensor 61 and/or the voltage sensor 62 may be provided as long as a current path is between the DC power supply 43*a* and the battery pack 10.

Figure 7:
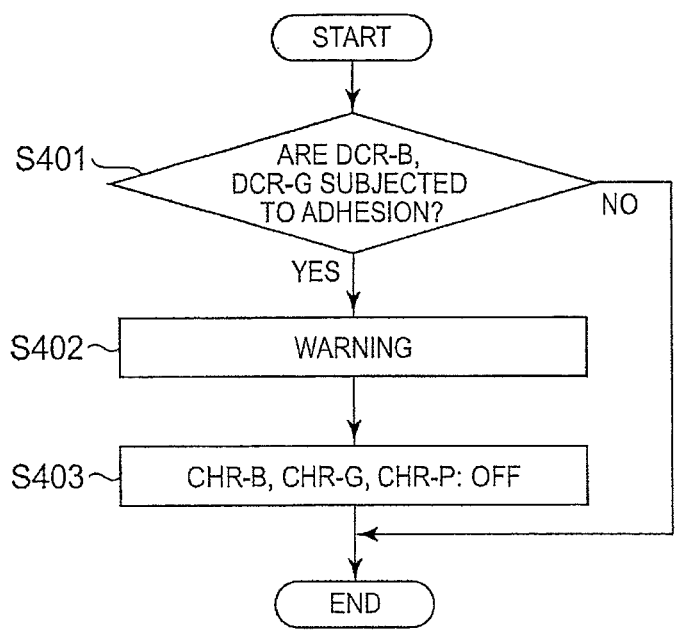
FIG. 7 is a flowchart illustrating process after adhesion of a charging relay is determined.

Process after the process shown in FIG. 5 is performed is illustrated using a flowchart shown in FIG. 7. The processing shown in FIG. 7 is performed by the controller 50.

In step S401, the controller 50 determines whether at least one of the charging relays DCR-B, DCR-G is subjected to adhesion. The determination is performed based on the set information of the flag described in the process shown in FIG. 5. That is, when the flag indicating adhesion of the charging relays DCR-B, DCR-G is set, the controller 50 determines that the charging relays DCR-B, DCR-G are subjected to adhesion.

When both of the charging relays DCR-B, DCR-G are not subjected to adhesion, the controller 50 finishes the process shown in FIG. 7. When at least one of the charging relays DCR-B, DCR-G is subjected to adhesion, the controller 50 gives a warning to a user or the like in step S402. A commonly known method may be appropriately employed as the method of giving a warning. For example, a warning may be given to a user or the like by outputting a sound or displaying on a display device. The warning may be specific to the adhesion of the charging relays DCR-B, DCR-Q or may be not specific.

In step S403, the controller 50 turns off the charging relays CHR-B, CHR-G, CHR-P. That is, during a period in which a flag indicating the adhesion of the charging relays DCR-B, DCR-G is set, the controller 50 keeps the charging relays CHR-B, CHR-G, CHR-P in the off state continuously.

If the charging relays DCR-B, DCR-G are subjected to adhesion and the charging relays CHR-B, CHR-G are in the on state, voltage of the battery pack 10 will be applied to the inlet 41 after the connector 42 is removed from the inlet 41. In order to prevent this case, in the present embodiment, when at least one of the charging relays DCR-B, DCR-G is subjected to adhesion, the charging relays CHR-B, CHR-G, CHR-P are turned off.

By turning off the charging relays CHR-B, CHR-G, CHR-P, the voltage of the battery pack 10 can be prevented from being applied to the inlet 41 even if the charging relays DCR-B, DCR-G are subjected to adhesion. Furthermore, even if the charging relays CHR-B, CHR-G, CHR-P are in the off state, the system main relays SMR-B, SMR-G are turned on to allow the vehicle to travel, through those as described above.

When the charging relays CHR-B, CHR-G, CHR-P are turned off, electric power from the AC power supply 34 and the DC power supply 43a cannot be supplied to the battery pack 10. That is, the battery pack 10 cannot be charged. Thus, the SOC of the battery pack 10 will decrease continuously. Herein, as for the configuration shown in FIG. 1, power of the engine 24 can be used to make the vehicle continue to travel, even if the SOC of the battery pack 10 decreases so excessively that the battery pack 10 cannot be discharged.

Furthermore, the voltage of the battery pack 10 is not applied to the inlet 32. As described above, the charger 31 is provided between the battery pack 10 and the inlet 32, and an interior (between two transformers) of the charger 31 is in an insulation state. Therefore, the case that the voltage of the battery pack 10 is applied to the inlet 32 may be not considered.

Figure 8:
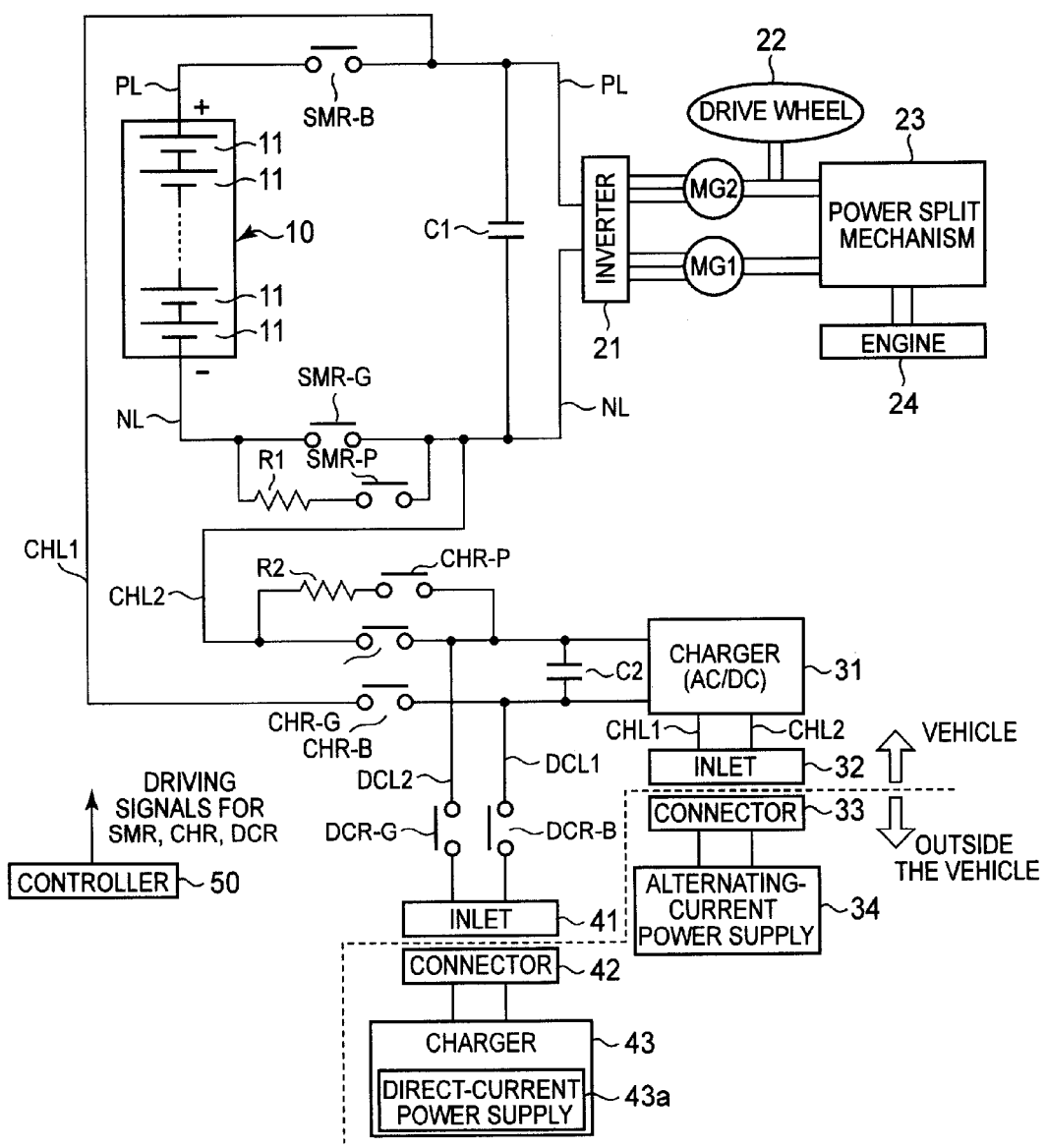
FIG. 8 is a diagram showing a configuration of a battery system as a variant of the first embodiment.

A variant of the present embodiment is illustrated using FIG. 8. FIG. 8 is a view corresponding to FIG. 2. In the variant, aspects different from the present embodiment are mainly described.

In a battery system shown in FIG. 8, the charging line CHL1 is connected to the positive electrode line PL between the system main relay SMR-B and the inverter 21. The charging line CHL2 is connected to the negative electrode line NL between the system main relays SMR-G, SMR-P and the inverter 21.

In the variant, when the battery pack 10 is charged using the AC power supply 34 or the DC power supply 43a, the system main relays SMR-B, SMR-G need to be turned on. That is, in the process shown in FIG. 3 and/or FIG. 4, it suffices to turn on the system main relays SMR-B, SMR-G before starting charging.

In the process shown in FIG. 3, for example, the system main relays SMR-B, SMR-G are turned on between the process of the step S101 and the process of the step S102. Furthermore, in the processing shown in FIG. 4, for example, the system main relays SMR-B, SMR-G are turned on between the process of the step S201 and the process of the step S202.

On the other hand, when the adhesion of the charging relays DCR-B, DCR-G is determined, the system main relays SMR-B, SMR-G also need to be turned on. Specifically, when the process shown in FIG. 5 is performed, it suffices to turn on the system main relays SMR-B, SMR-G before the process of the step S302 is performed. Herein, the system main relays SMR-B, SMR-G may be turned on by performing the same process as the process illustrated in the present embodiment.

In the variant, when at least one of the charging relays DCR-B, DCR-G is subjected to adhesion, it suffices to turn off the charging relays CHR-B, CHR-G, CHR-P, similar to the present embodiment. Thus, even if the system main relays SMR-B, SMR-G are in the on state, the voltage of the battery pack 10 can be prevented from being applied to the inlet 41. Furthermore, it is possible that the system main relays SMR-B, SMR-G are in the on state while the vehicle is allowed to travel.

What is claimed is:

1. An electrical storage system, comprising:
    an electrical storage device configured to charge and discharge;
    a motor connected to the electrical storage device via an electrode line, the motor being configured to receive electric power output from the electrical storage device to generate power allowing a vehicle to travel;
    a system main relay provided on the electrode line;
    a first charging line connected to the electrode line, the first charging line being configured to supply electric power from an alternative current (AC) power supply provided outside the vehicle to the electrical storage device;
    a charger provided on the first charging line, the charger being configured to convert AC power from the AC power supply into direct current (DC) power and output the DC power to the electrical storage device;
    a first charging relay provided on the first charging line between the electrical storage device and the charger;
    a second charging line connected to the first charging line between the charger and the first charging relay, the second charging line being configured to supply electric power from a DC power supply provided outside the vehicle to the electrical storage device;
    an inlet provided at an end of the second charging line and connectable with a connector connected to the DC power supply;
    a second charging relay provided on the second charging line; and
    a controller configured to
    (a) control an energizing state and an non-energizing state of the system main relay, the first charging relay and the second charging relay, and (b) cause the first charging relay to become the non-energizing state when the second charging relay in the energizing state is subjected to adhesion.

2. The electrical storage system according to claim 1, wherein the first charging line is connected to the electrode line between the electrical storage device and the system main relay.

3. The electrical storage system according to claim 2, wherein
the controller determines that the second charging relay in the energizing state is subjected to adhesion, when a driving signal causing the second charging relay to become the non-energizing state has been output and the second charging line is in the energizing state.

4. The electrical storage system according to claim 1, wherein
the controller determines that the second charging relay in the energizing state is subjected to adhesion, when a driving signal causing the second charging relay to become the non-energizing state has been output and the second charging line is in the energizing state.

5. The electrical storage system according to claim 1, wherein
the vehicle uses power from at least one of the motor or an engine to travel.

* * * * *